US012770427B2

(12) United States Patent
Seo et al.

(10) Patent No.: US 12,770,427 B2
(45) Date of Patent: Oct. 20, 2026

(54) DEVICE AND METHOD OF CLASSIFYING FINGERPRINT PATTERN TYPE USING DEEP LEARNING

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Young Il Seo, Wonju-si (KR); Ho Yong Yie, Wonju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 0 days.

(21) Appl. No.: 19/192,010

(22) Filed: Apr. 28, 2025

(65) Prior Publication Data

US 2026/0279097 A1 Sep. 17, 2026

(30) Foreign Application Priority Data

Mar. 11, 2025 (KR) ........................ 10-2025-0031399

(51) Int. Cl.

*G06V 40/13* (2022.01)
*G06V 10/26* (2022.01)
*G06V 10/82* (2022.01)
*G06V 40/12* (2022.01)

(52) U.S. Cl.

CPC .......... *G06V 40/1376* (2022.01); *G06V 10/26* (2022.01); *G06V 10/82* (2022.01); *G06V 40/1359* (2022.01)

(58) Field of Classification Search

None
See application file for complete search history.

(56) References Cited

U.S. PATENT DOCUMENTS

2006/0153432 A1* 7/2006 Lo ...................... G06V 40/1365 283/68
2017/0220836 A1* 8/2017 Phillips ................. G06F 18/214
2024/0127611 A1* 4/2024 Hawe ..................... G06V 20/70
2025/0391198 A1* 12/2025 Hirokawa .......... G06V 40/1376

* cited by examiner

*Primary Examiner* — Joseph R Haley
(74) *Attorney, Agent, or Firm* — Hauptman Ham, LLP

(57) ABSTRACT

A fingerprint pattern type classification method using deep learning includes: obtaining a plurality of fingerprint images; classifying and labeling the obtained fingerprint images based on a predefined classification system; generating a fingerprint image database by storing the classified and labeled fingerprint images; extracting training data and validation data from the fingerprint image database and separating them according to a preset ratio; performing deep learning model training using the training data; performing validation of the trained deep learning model using the validation data; performing pattern classification of the fingerprint images using the trained deep learning model; and performing detailed classification for each pattern through machine learning using a result of the pattern classification of the fingerprint images as input.

13 Claims, 7 Drawing Sheets

DEVICE AND METHOD OF CLASSIFYING FINGERPRINT PATTERN TYPE USING DEEP LEARNING

CROSS-REFERENCE TO RELATED APPLICATIONS

The present application is based on and claims priority to Korean Patent Application No. 10-2025-0031399, filed on Mar. 11, 2025, in the Korean Intellectual Property Office, which is incorporated herein by reference in its entirety.

BACKGROUND

1. Field

One or more embodiments relate to a device and method of classifying fingerprint pattern types using deep learning.

2. Description of the Related Art

Fingerprint evidence found at a crime scene is one of the important pieces of evidence that can be used to identify the criminal.

Once fingerprints are secured at the crime scene, work is done to identify who the fingerprints belong to. Currently, the National Police Agency uses the Automatic Fingerprint Identification System (AFIS) to obtain a list of key suspects. Once the list of key suspects is secured, experts determine whether the fingerprints are identical in the following order: analysis, comparison, evaluation, and verification.

When performing analysis, pattern types of the fingerprints are classified and quality levels of the fingerprints are evaluated. By classifying the pattern types of the fingerprints, fingerprints with different pattern types may be excluded and screened out.

If there are many fingerprints to compare, analysis requires a considerable amount of time and manpower. Therefore, an automated fingerprint classification system is needed because automating fingerprint classification may reduce time and manpower, and cross-verification may be performed to increase the reliability of fingerprint classification.

Currently, deep learning is making significant technological progress in the field of forensic science, and there is a need to apply deep learning to the field of fingerprint classification.

SUMMARY

One or more embodiments include a device and method of classifying fingerprint pattern types using deep learning, which reduce expert fatigue, increase analysis speed, and improve accuracy during field analysis through automatic classification of fingerprints.

According to one or more embodiments, a fingerprint pattern type classification method using deep learning includes: obtaining a plurality of fingerprint images; classifying and labeling the obtained fingerprint images based on a predefined classification system; generating a fingerprint image database by storing the classified and labeled fingerprint images; extracting training data and validation data from the fingerprint image database and separating them according to a preset ratio; performing deep learning model training using the training data; performing validation of the trained deep learning model using the validation data; performing pattern classification of the fingerprint images using the trained deep learning model; and performing detailed classification for each pattern through machine learning using a result of the pattern classification of the fingerprint images as input.

In an embodiment, the fingerprint images may include an original fingerprint image and an extended fingerprint image.

In an embodiment, the extended fingerprint image is generated by dividing the original fingerprint image into a plurality of sections and applying an opacity filter to the divided fingerprint image.

In an embodiment, the fingerprint pattern type classification method may include outputting results of the pattern classification of the fingerprint images and the detailed classification for each pattern.

In an embodiment, the fingerprint pattern type classification method may include performing additional training of the trained deep learning model using an additional fingerprint image based on a validation result of the trained deep learning model.

In an embodiment, the pattern classification of the fingerprint images may include: first classification, which classifies the fingerprint images into a loop, whorl, arch, and other patterns according to ridge pattern characteristics; and second classification, which classifies the loop into a right loop and left loop, classifies the whorl into a plain whorl, double-loop whorl, central pocket loop whorl, and accidental whorl, wherein the plain whorl is classified into a simple whorl and annular whorl, and the simple whorl and annular whorl are classified into clockwise rotation and counterclockwise rotation, and the double-loop whorl is classified into clockwise rotation and counterclockwise rotation, classifies the arch into a plain arch and tented arch, and classifies the other patterns into mutilated or extensively scarred patterns and amputations.

In an embodiment, the detailed classification for each pattern of the fingerprint images may include classification by checking the number of ridges and locations of tracing lines.

In an embodiment, the detailed classification for each pattern of the fingerprint images may include classifying the right loop and the left loop according to the number of ridges crossing an imaginary line between a core and delta, and classifying the clockwise and counterclockwise rotations of the simple whorl, annular whorl, and double-loop whorl into inner tracing, outer tracing, and meeting tracing.

According to one or more embodiments, a fingerprint pattern type classification device using deep learning includes: at least one memory storing at least one instruction; and at least one processor, wherein the at least one processor is configured to execute the at least one instruction to: obtain a plurality of fingerprint images; classify and label the obtained fingerprint images based on a predefined classification system; generate a fingerprint image database by storing the classified and labeled fingerprint images; extract training data and validation data from the fingerprint image database and separate them according to a preset ratio; perform deep learning model training using the training data; perform validation of the trained deep learning model using the validation data; perform pattern classification of the fingerprint images using the trained deep learning model; and perform detailed classification for each pattern through machine learning using a result of the pattern classification of the fingerprint images as input.

In an embodiment, the at least one processor is configured to execute the at least one instruction to: output results of the pattern classification of the fingerprint images and the detailed classification for each pattern.

In an embodiment, the at least one processor is configured to execute the at least one instruction to: perform additional training of the trained deep learning model using an additional fingerprint image based on a validation result of the trained deep learning model.

A non-transitory computer-readable recording medium having recorded thereon a computer program according to an embodiment may execute a fingerprint pattern type classification method using deep learning by using a computer.

Additional aspects will be set forth in part in the description which follows and, in part, will be apparent from the description, or may be learned by practice of the embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
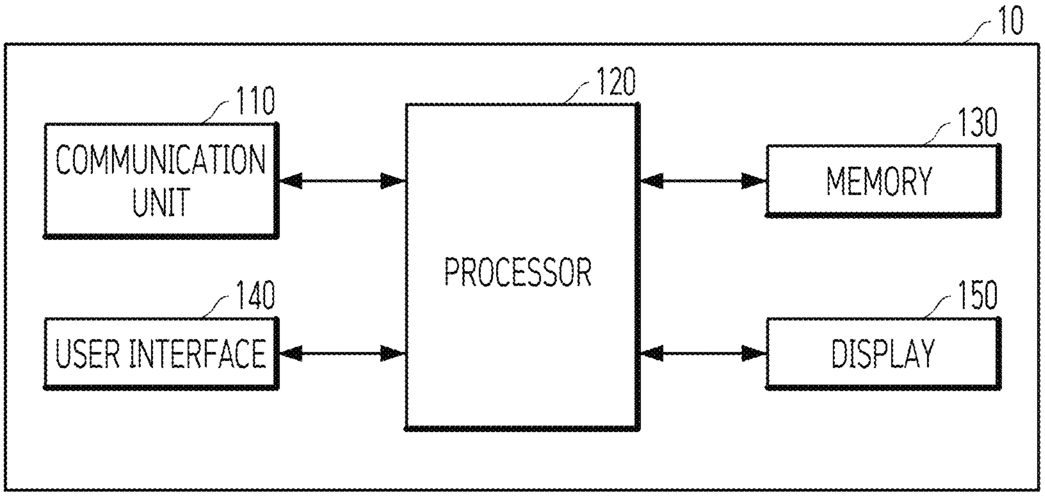
FIG. 1 is a schematic configuration diagram of a fingerprint pattern type classification device using deep learning, according to an embodiment.

Hereinafter, embodiments will be described in detail with reference to the accompanying drawings. The same reference numerals are used to denote the same elements, and repeated descriptions thereof will be omitted.

It will be understood that although the terms “first,” “second,” etc. may be used herein to describe various components, these components should not be limited by these terms.

An expression used in the singular encompasses the expression of the plural, unless it has a clearly different meaning in the context.

It will be further understood that the terms such as “include,” “comprise,” and “have” used herein specify the presence of stated features or components, but do not preclude the presence or addition of one or more other features or components.

In the specification, a “fingerprint” is a unique pattern on the tip of a person’s finger, which is a ridge pattern on the surface of the skin. The “fingerprint” includes ridges, which are raised lines at the entrance of sweat glands in the skin of a fingertip, and valleys, which are indentations between the ridges.

FIG. 1 is a schematic configuration diagram of a fingerprint pattern type classification device using deep learning, according to an embodiment.

Referring to FIG. 1, a fingerprint pattern type classification device 10 may include a communication unit 110, a processor 120, a memory 130, a user interface 140, and a display 150. The fingerprint pattern type classification device 10 to which the disclosure is applied may be an information processing device used by a user. However, the disclosure is not limited thereto, and the fingerprint pattern type classification device 10 may further include other components or some components may be omitted.

The fingerprint pattern type classification device 10 may include at least one of a personal computer (PC), a laptop computer, a mobile phone, a tablet PC, a smart phone, a personal digital assistant (PDA), and a portable multimedia player (PMP).

The communication unit 110 is connected to the processor 120 and the memory 130 to transmit and receive data. The communication unit 110 may be connected to another external device to transmit and receive data. Hereinafter, the expression “transmitting and receiving A” may indicate transmitting and receiving “information or data representing A.”

The communication unit 110 may be implemented as circuitry within the fingerprint pattern type classification device 10. For example, the communication unit 110 may include an internal bus and an external bus. As another example, the communication unit 110 may be an element that connects the fingerprint pattern type classification device 10 to an external device. The communication unit 110 may be an interface. The communication unit 110 may receive data from an external device and transmit the data to the processor 120 and the memory 130. For example, the communication unit 110 may receive a fingerprint image from a photographing device.

The processor 120 may control operations of the fingerprint pattern type classification device 10 according to an embodiment and perform logical operations.

The processor 120 processes data received by the communication unit 110 and data stored in the memory 130. The processor 120 may be a data processing device implemented in hardware having a circuit with a physical structure for performing desired operations. For example, desired operations may include code or instructions included in a program.

The processor 120 executes computer-readable code (e.g., software) stored in a memory (e.g., the memory 130) and instructions triggered by the processor 120.

The processor 120 controls the execution of a desired operation by executing at least one instruction stored in the memory 130. The at least one instruction may be stored in an internal memory included in the processor 120 or in the memory 130 included in a data processing device separately from the processor 120.

For example, the processor 120 may perform the following operations 210 to 290, which will be described in detail later.

The memory 130 stores data received by the communication unit 110 and data processed by the processor 120. The memory 130 may store a program (or application or software) that operates the fingerprint pattern type classification device 10. The stored program may be coded to control the fingerprint pattern type classification device 10 and may be executable by the processor 120.

The memory 130 may include a volatile memory such as static RAM (SRAM), dynamic RAM (DRAM) or synchronous DRAM (SDRAM), or a non-volatile memory such as a flash memory, phase-change RAM (PRAM), magnetic RAM (MRAM), resistive RAM (RRAM) or ferroelectric RAM (FRAM).

The user interface 140 may receive a user input for controlling the fingerprint pattern type classification device 10. The user interface 140 may include, but is not limited to, a touch panel for detecting a user's touch, a button for receiving a user's push operation, a mouse or keyboard for specifying or selecting a point on a user interface screen, etc.

The user interface 140 may be, for example, at least one graphical user interface (GUI) provided for controlling the fingerprint pattern type classification device 10.

The display 150 may display and output information processed in the fingerprint pattern type classification device 10. For example, the display 150 may display a GUI for controlling the fingerprint pattern type classification device 10.

The display 150 may be implemented as, but is not limited to, a liquid crystal display (LCD), a plasma display panel (PDP), an organic light emitting display (OLED), a field emission display (FED), an LED, a flexible display, a three-dimensional (3D) display, etc. Also, the display 150 may be configured as a touch screen and used as an input device in addition to an output device.

In addition, in other embodiments, the fingerprint pattern type classification device 10 may include more components than the components of FIG. 1. For example, the fingerprint pattern type classification device 10 may further include other components such as a battery and charging device that powers internal components, a database, etc.

Figure 2:
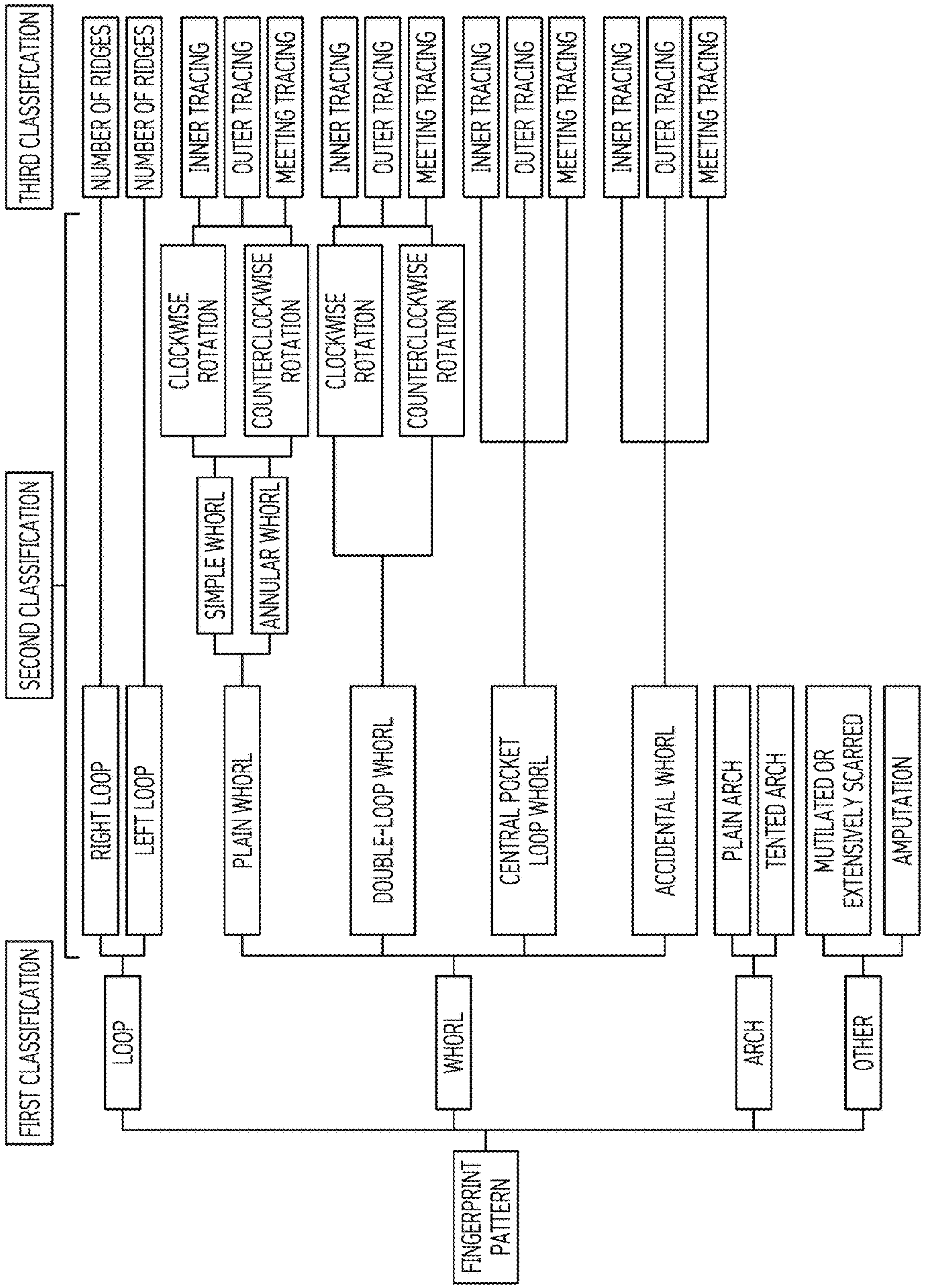
FIG. 2 is a view of a fingerprint classification system.
Figure 3:
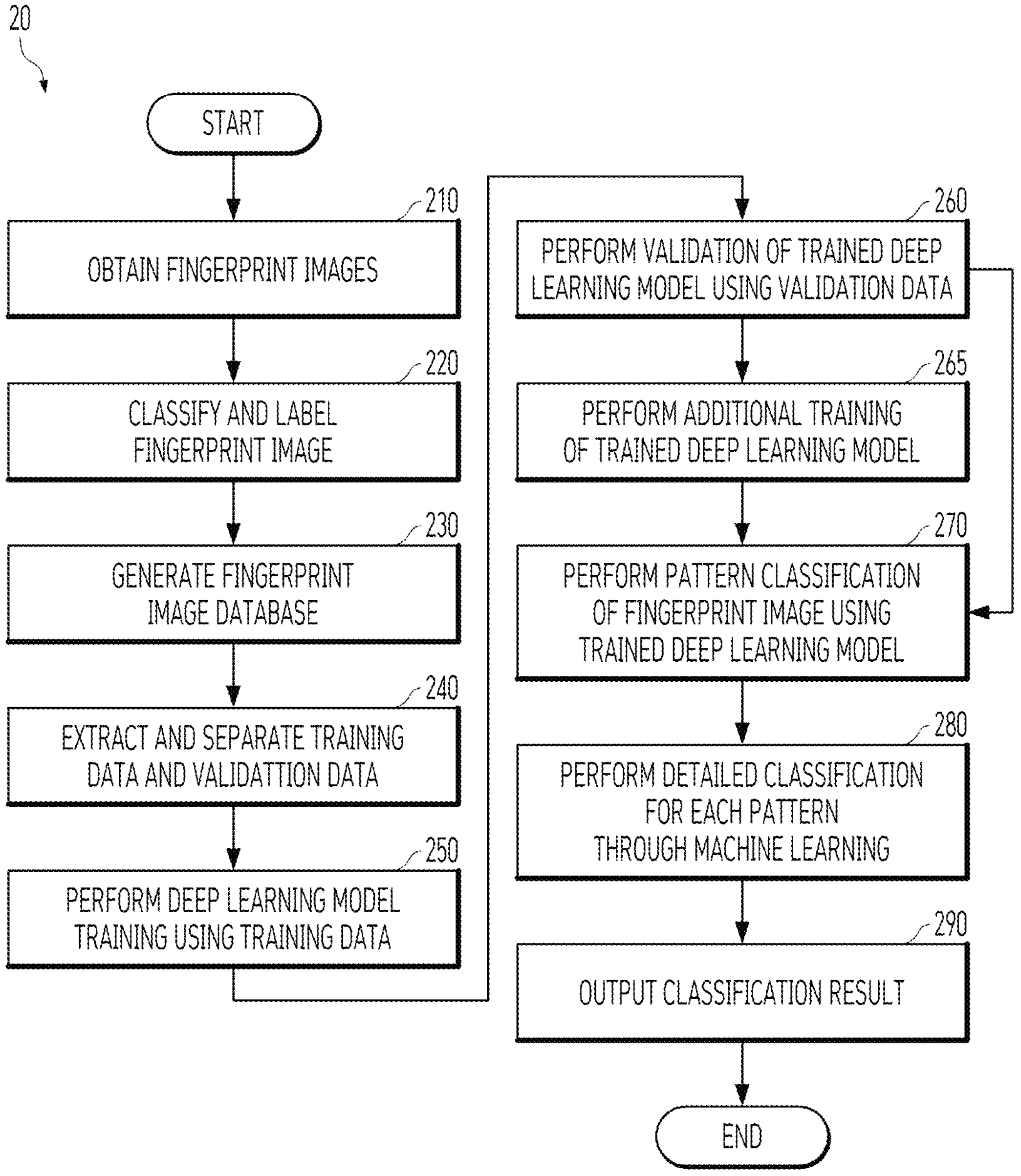
FIG. 3 is a flowchart illustrating a fingerprint pattern type classification method using deep learning, according to an embodiment.

FIG. 2 is a view of a fingerprint classification system. FIG. 3 is a flowchart illustrating a fingerprint pattern type classification method using deep learning, according to an embodiment. FIGS. 4 to 6B are views illustrating a process of generating an extended fingerprint image.

Referring to FIGS. 2 to 6B, the fingerprint pattern type classification method 20 using deep learning according to an embodiment will be described.

The following operations may be performed by the fingerprint pattern type classification device 10 described above.

In operation 210, the fingerprint pattern type classification device 10 may obtain a plurality of fingerprint images.

The fingerprint pattern type classification device 10 may receive a plurality of fingerprint images obtained from a photographing device through the communication unit 110. In addition, the fingerprint pattern type classification device 10 may include a camera including a lens and an image sensor. The image sensor may convert an image input by the lens into an electrical signal, and may be a semiconductor device such as a charge-coupled device (CCD) or a complementary metal oxide semiconductor (CMOS).

The plurality of fingerprint images may include an original fingerprint image and an extended fingerprint image.

Because fingerprint use is on the human body, review and approval by the Institutional Review Board (IRB) may be required. Original fingerprint images may be obtained by photographing approved fingerprints or fingerprints obtained at a crime scene with a photographing device.

The obtained fingerprint images may include real images captured by a camera, scanned document images, etc.

The obtained fingerprint images undergo a preprocessing process. The preprocessing process may include resizing, noise removal, brightness/contrast normalization, rotation/inversion correction, etc. of the fingerprint images. This is to improve the accuracy of subsequent classification tasks and ensure data consistency.

In addition, an extended fingerprint image may be generated for each original fingerprint image for more accurate classification. An extended fingerprint image may be generated through various transformations and processing based on the obtained original fingerprint image. The extended fingerprint image may be generated by rotating, resizing, color conversion, adding noise, etc. of the original fingerprint image.

According to an embodiment, an extended fingerprint image is generated by dividing an original fingerprint image into a plurality of sections and applying an opacity filter to the divided fingerprint image.

Figure 4:
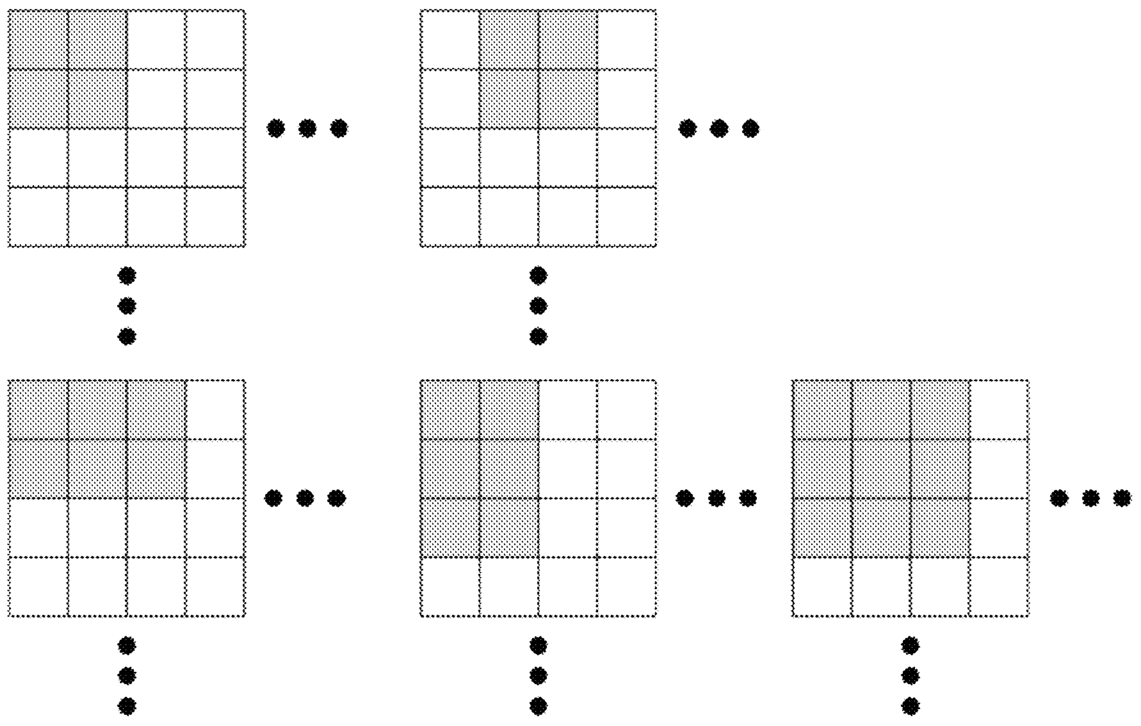
FIG. 4 is an exemplary view of a plurality of divided sections in an original fingerprint image for generating an extended fingerprint image.

Referring to FIG. 4, for example, each original fingerprint image is divided into 10 sections horizontally and vertically, resulting in a total of 100 sections. The divided sections may be combined to include at least 2 sections horizontally and vertically, and stored in a database in the form of a rectangle or square.

Figure 5A:
FIGS. 5A, 5B, and 5C are exemplary views of applying an opacity filter to a fingerprint image.
Figure 5B:
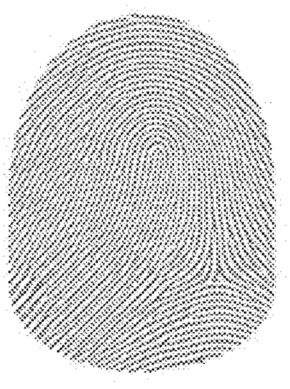
Figure 5C:
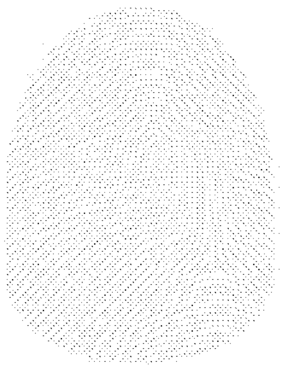

Referring to FIGS. 5A, 5B, and 5C, an opacity filter may be applied to divided fingerprint image in increments of 10% in a range of 0% to 90%. FIGS. 5A, 5B, and 5C show that the opacity filter is applied to the divided fingerprint image at 0%, 50%, and 90%, respectively.

Figure 6A:
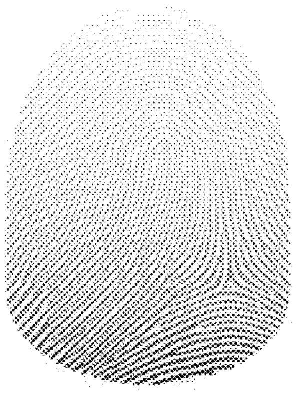
FIGS. 6A and 6B are exemplary views of applying an opacity filter that is gradated in one direction or two directions to a fingerprint image.
Figure 6B:

Referring to FIGS. 6A and 6B, an opacity filter that is gradated in one direction may be applied to a divided fingerprint image by rotating the opacity filter in increments of 45 degrees from 0 degrees (FIG. 6A). In addition, an opacity filter that is gradated in two directions may be applied to a divided fingerprint image by setting the center to be clearly visible, and then rotating the opacity filter in increments of 45 degrees from 0 degrees (FIG. 6B).

In operation 220, the obtained fingerprint image may be classified and labeled based on a predefined classification system.

The predefined classification system may be a fingerprint classification system classified according to fingerprint pattern characteristics. The fingerprint classification system may include first to third classifications.

The first classification may classify a fingerprint into a loop, whorl, arch, and other patterns according to ridge pattern characteristics.

The second classification is subclassification of the first classification and is as follows:

The loop may be classified into a right loop and left loop.

The whorl may be classified into a plain whorl, double-loop whorl, central pocket loop whorl, and accidental whorl. The plain whorl may be classified into a simple whorl and annular whorl, and the simple whorl and annular whorl are classified into clockwise rotation and counterclockwise rotation. The double-loop whorl may be classified into clockwise rotation and counterclockwise rotation.

The arch may be classified into a plain arch and tented arch.

Other patterns may be classified into mutilated or extensively scarred patterns and amputations.

The third classification is subclassification of the second classification. In addition, the third classification is detailed classification for each pattern of a fingerprint, and may be classified by checking the number of ridges and locations of tracing lines for each pattern.

For example, detailed classification for each pattern of a fingerprint is as follows:

The right loop and left loop may be classified according to the number of ridges crossing an imaginary line between a core and delta.

Clockwise and counterclockwise rotations of the simple whorl, annular whorl, and double-loop whorl may be classified into inner tracing, outer tracing, and meeting tracing. Labeling may be performed on the fingerprint image classified as above.

Labeling is a process of identifying content and features of an image and tagging them in a machine-learnable form.

In operation 230, a fingerprint image database may be generated by storing the classified and labeled fingerprint image.

Classified and labeled fingerprint images may be stored in a hierarchical structure according to assigned classification system and label. Each fingerprint image is assigned a unique identifier, and metadata may be recorded together. For example, metadata may include classification information and labels of a fingerprint image, information about distinguishing between original/extended fingerprint images, preprocessing history, conversion information used for data expansion, and characteristic information (size, format, etc.) of a fingerprint image. Metadata facilitates searching, filtering, and management of database, and enables efficient data selection and utilization during a deep learning model learning process.

Furthermore, fingerprint image database may be designed to be easily extensible to facilitate the addition of new fingerprint images or classification systems.

In operation 240, training data and validation data may be extracted from the fingerprint image database and separated according to a preset ratio.

A sufficient amount of data is required for deep learning and training a machine learning model, and this data is divided into training data and validation data. The training data is used for a model to learn patterns, and the validation data is used to evaluate the performance of a trained model.

Data suitable for training is extracted from the fingerprint image database.

Thereafter, the data is divided into training data and validation data according to a preset ratio (e.g., 80:20 or 70:30).

This process may be performed automatically without manual work, and may be applied by random sampling of data or according to specific criteria (e.g., maintaining class balance, etc.). This data division method may contribute to increasing the accuracy of training and preventing overfitting.

In operation 250, deep learning model training may be performed using the training data.

Deep learning is a field of machine learning that learns data using a multilayer neural network and automatically extracts features to recognize patterns. For example, deep learning models that can be applied to the embodiments include a convolutional neural network (CNN) and Residual Network (ResNet).

The training data may be input into a deep learning model, and weights may be optimized using a loss function and an optimizer.

The loss function may be measured by quantifying a difference between an actual value and a predicted value of the deep learning model. A weight and bias of the deep learning model are updated based on the loss function, and the optimizer (e.g., Adam or SGD) may optimize the model using gradient descent.

During the deep learning model training process, hyperparameters such as learning rate, batch size, and the number of epochs may be adjusted to derive optimal performance.

In operation 260, validation of the trained deep learning model may be performed using the validation data.

The performance of the model may be evaluated using validation data that was not used as training data. During the validation process, evaluation indices may be derived by comparing a predicted value output by the deep learning model with an actual correct value. Such evaluation indices may include accuracy, precision, recall, F1-score, and loss function values.

For example, deep learning model training is performed over 100,000 epochs using ResNet-101. The learning rate is set to 0.001, and validation may be performed in 10 cycles.

After operation 260 of performing validation of the trained deep learning model, the following operation 265 may be added.

In operation 265, based on a validation result of the trained deep learning model, additional training of the trained deep learning model may be performed using an additional fingerprint image.

The additional fingerprint image is a fingerprint image that was not used for training and validation.

In the additional training process, the performance of the model may be optimized by retraining the existing deep learning model using the additional fingerprint image. To this end, the additional fingerprint image may be used as training data after improving data quality through a preprocessing process.

In addition, according to an embodiment, instead of retraining the entire weights of the existing deep learning model, a fine-tuning method that tunes only the weights of a specific layer of the deep learning model may be applied.

In operation 270, pattern classification of a fingerprint image may be performed using the trained deep learning model.

Using the trained deep learning model, key features may be extracted from an input fingerprint image, and the overall pattern of the fingerprint image may be classified based on the key features.

The pattern classification of the fingerprint image may include the first classification and the second classification described above.

The first classification may classify the fingerprint image into loop, whorl, arch, and other patterns according to ridge pattern characteristics.

The second classification is subclassification of the first classification.

The loop may be classified into a right loop and left loop.

The whorl may be classified into a plain whorl, double-loop whorl, central pocket loop whorl, and accidental whorl. The plain whorl may be classified into a simple whorl and annular whorl, and the simple whorl and annular whorl are classified into clockwise rotation and counterclockwise rotation. The double-loop whorl may be classified into clockwise rotation and counterclockwise rotation.

The arch may be classified into a plain arch and tented arch.

Other patterns may be classified into mutilated or extensively scarred patterns and amputations.

In operation 280, detailed classification for each pattern may be performed through machine learning using a result of the pattern classification of the fingerprint image as input.

Using the result of the pattern classification as input, detailed classification may be performed using machine learning. For example, a machine learning model may apply a random forest, a support vector machine (SVM), or a neural network with a more complex structure.

For example, detailed classification for each pattern of the fingerprint image is performed by checking the number of ridges and locations of tracing lines.

In more detail, the right loop and left loop may be classified according to the number of ridges crossing an imaginary line between the core and delta. Clockwise and counterclockwise rotations of the simple whorl, annular whorl, and double-loop whorl may be classified into inner tracing, outer tracing, and meeting tracing.

In operation 290, the fingerprint pattern type classification device 10 may output a classification result.

Operation 290 of outputting the classification result may include an operation of displaying results of the pattern classification of the fingerprint image and the detailed classification for each pattern (e.g., results of the first to third classifications), respectively.

Figure 7:
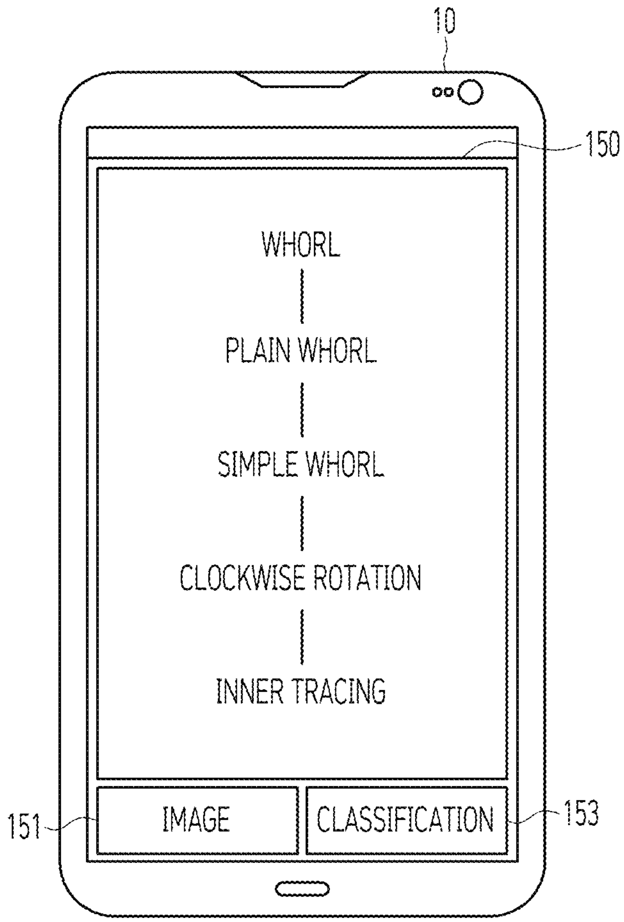
FIG. 7 is a view illustrating an output of a display according to an embodiment.

FIG. 7 is a view illustrating an output of a display according to an embodiment.

For example, referring to FIG. 7, a classification result for a specific fingerprint image may be displayed on the display 150. When a user selects a fingerprint image by an 'image' button 151 and classifies it by a 'classification' button 153, it can be displayed as 'whorl-plain whorl-simple whorl-clockwise rotation-inner tracing.'

As another example, a GUI may include highlighting a node corresponding to the classification result for the specific fingerprint image on a logic tree. Highlighting a node may be expressed by changing the color of the node or changing the configuration of the node (node shape, font size, etc.). In addition, highlighting can be done by expanding/reducing the size of the node. Accordingly, users may check where the classification result is located on the logic tree.

The fingerprint pattern type classification method 20 according to various embodiments illustrated in FIG. 3 can be written as computer programs and can be implemented in general-use digital computers that execute the programs using a non-transitory computer-readable recording medium. The non-transitory computer-readable recording medium may be a magnetic storage medium (e.g., ROM, a floppy disk, a hard disk, etc.), or an optical reading medium (e.g., a CD ROM, a digital versatile disk (DVD) or the like).

According to an embodiment, fingerprint classification may be easily performed when observing fingerprints at a crime scene, thereby contributing to reducing fatigue of experts, increasing analysis speed, and improving accuracy when analyzing a crime scene.

According to an embodiment, the accuracy of fingerprint image classification may be improved by first classifying the overall pattern of a fingerprint image and then performing detailed classification related to feature points for each pattern.

The description herein is for describing the disclosure and numerous modifications and adaptations will be readily apparent to one of ordinary skill in the art without departing from the spirit and scope of the disclosure. For example, the relevant results may be achieved even when the described technologies are performed in a different order than the described methods, and/or even when the described elements such as systems, structures, devices, and circuits are coupled or combined in a different form than the described methods or are replaced or substituted by other elements or equivalents.

Accordingly, while the disclosure has been particularly shown and described with reference to embodiments thereof, it will be understood that various changes in form and details may be made therein without departing from the spirit and scope of the following claims.

What is claimed is:

1. A fingerprint pattern type classification method using deep learning, the fingerprint pattern type classification method comprising:
- obtaining a plurality of fingerprint images;
- classifying and labeling the obtained fingerprint images based on a predefined classification system;
- generating a fingerprint image database by storing the classified and labeled fingerprint images;
- extracting training data and validation data from the fingerprint image database and separating them according to a preset ratio;
- performing deep learning model training using the training data;
- performing validation of the trained deep learning model using the validation data;
- performing pattern classification of the fingerprint images using the trained deep learning model; and
- performing detailed classification for each pattern through machine learning using a result of the pattern classification of the fingerprint images as input,
- wherein the fingerprint images comprise an original fingerprint image and an extended fingerprint image, and
- wherein the extended fingerprint image is generated by dividing the original fingerprint image into a plurality of sections and applying an opacity filter to the divided fingerprint image.

2. The fingerprint pattern type classification method of claim 1, further comprising:
- outputting results of the pattern classification of the fingerprint images and the detailed classification for each pattern.

3. The fingerprint pattern type classification method of claim 1, further comprising:
- performing additional training of the trained deep learning model using an additional fingerprint image based on a validation result of the trained deep learning model.

4. The fingerprint pattern type classification method of claim 1, wherein the pattern classification of the fingerprint images comprises:
- first classification, which classifies the fingerprint images into a loop, whorl, arch, and other patterns according to ridge pattern characteristics; and
- second classification, which
  - classifies the loop into a right loop and left loop,
  - classifies the whorl into a plain whorl, double-loop whorl, central pocket loop whorl, and accidental whorl, wherein the plain whorl is classified into a simple whorl and annular whorl, and the simple whorl and annular whorl are classified into clockwise rotation and counterclockwise rotation, and the double-loop whorl is classified into clockwise rotation and counterclockwise rotation,
  - classifies the arch into a plain arch and tented arch, and
  - classifies the other patterns into mutilated or extensively scarred patterns and amputations.

5. The fingerprint pattern type classification method of claim 1, wherein the detailed classification for each pattern of the fingerprint images comprises classification by checking a number of ridges and locations of tracing lines.

6. The fingerprint pattern type classification method of claim 1, wherein the detailed classification for each pattern of the fingerprint images comprises:

classifying the right loop and the left loop according to a number of ridges crossing an imaginary line between a core and delta; and classifying the clockwise and counterclockwise rotations of the simple whorl, annular whorl, and double-loop whorl into inner tracing, outer tracing, and meeting tracing.

7. A fingerprint pattern type classification device using deep learning, the fingerprint pattern type classification device comprising:

at least one memory storing at least one instruction; and at least one processor, wherein the at least one processor is configured to execute the at least one instruction to:

obtain a plurality of fingerprint images;

classify and label the obtained fingerprint images based on a predefined classification system;

generate a fingerprint image database by storing the classified and labeled fingerprint images;

extract training data and validation data from the fingerprint image database and separating them according to a preset ratio;

perform deep learning model training using the training data;

perform validation of the trained deep learning model using the validation data;

perform pattern classification of the fingerprint images using the trained deep learning model; and perform detailed classification for each pattern through machine learning using a result of the pattern classification of the fingerprint images as input, wherein the fingerprint images comprise an original fingerprint image and an extended fingerprint image, and wherein the extended fingerprint image is generated by dividing the original fingerprint image into a plurality of sections and applying an opacity filter to the divided fingerprint image.

8. The fingerprint pattern type classification device of claim 7, wherein the at least one processor is configured to execute the at least one instruction to:

output results of the pattern classification of the fingerprint images and the detailed classification for each pattern.

9. The fingerprint pattern type classification device of claim 7, wherein the at least one processor is configured to execute the at least one instruction to:

perform additional training of the trained deep learning model using an additional fingerprint image based on a validation result of the trained deep learning model.

10. The fingerprint pattern type classification device of claim 7, wherein the pattern classification of the fingerprint images comprises:

first classification, which classifies the fingerprint images into a loop, whorl, arch, and other patterns according to ridge pattern characteristics; and second classification, which classifies the loop into a right loop and left loop, classifies the whorl into a plain whorl, double-loop whorl, central pocket loop whorl, and accidental whorl, wherein the plain whorl is classified into a simple whorl and annular whorl, and the simple whorl and annular whorl are classified into clockwise rotation and counterclockwise rotation, and the double-loop whorl is classified into clockwise rotation and counterclockwise rotation, classifies the arch into a plain arch and tented arch, and classifies the other patterns into mutilated or extensively scarred patterns and amputations.

11. The fingerprint pattern type classification device of claim 7, wherein the detailed classification for each pattern of the fingerprint images comprises classification by checking a number of ridges and locations of tracing lines.

12. The fingerprint pattern type classification device of claim 7, wherein the detailed classification for each pattern of the fingerprint images comprises:

classifying the right loop and the left loop according to a number of ridges crossing an imaginary line between a core and delta; and classifying the clockwise and counterclockwise rotations of the simple whorl, annular whorl, and double-loop whorl into inner tracing, outer tracing, and meeting tracing.

13. A non-transitory computer-readable medium storing a computer program for executing the method of claim 1 using a computer.

* * * * *